US012632881B2

(12) United States Patent
Moshkovich

(10) Patent No.: US 12,632,881 B2
(45) Date of Patent: May 19, 2026

(54) REAL-TIME DIGITAL CONNECTION DURING A TRANSACTION

(71) Applicant: DNR Business Solutions Inc., Chatsworth, CA (US)

(72) Inventor: Nathan Moshkovich, Chatsworth, CA (US)

(73) Assignee: SURGEPAYS, INC., Bartlett, TN (US)

( * ) Notice: Subject to any disclaimer, the term of this patent is extended or adjusted under 35 U.S.C. 154(b) by 16 days.

(21) Appl. No.: 17/887,262

(22) Filed: Aug. 12, 2022

(65) Prior Publication Data

US 2024/0054521 A1     Feb. 15, 2024

(51) Int. Cl.
*G06Q 30/0226* (2023.01)
*G06K 19/06* (2006.01)
*G06K 19/07* (2006.01)

(52) U.S. Cl.
CPC ...  *G06Q 30/0226* (2013.01); *G06K 19/06037* (2013.01); *G06K 19/0723* (2013.01)

(58) Field of Classification Search
CPC ..................... G06Q 30/0226; G06K 19/06037
See application file for complete search history.

(56) References Cited

U.S. PATENT DOCUMENTS

| | | | | | |
|---|---|---|---|---|---|
| 9,805,338 | B1 * | 10/2017 | Ghosn | .................... | G06Q 30/08 |
| 11,805,032 | B2 * | 10/2023 | Madafferi | ............ | G06Q 40/123 |
| 2002/0083164 | A1 * | 6/2002 | Katayama | ............ | G06Q 10/087 |
| | | | | | 705/28 |

| | | | | | |
|---|---|---|---|---|---|
| 2004/0167840 | A1 * | 8/2004 | Tully | ..................... | G06Q 40/06 |
| | | | | | 705/35 |
| 2005/0203828 | A1 * | 9/2005 | Lyakovetsky | .......... | G06Q 10/10 |
| | | | | | 705/1.1 |
| 2005/0262161 | A1 * | 11/2005 | Holmes | .................. | G06Q 30/04 |
| 2007/0266149 | A1 * | 11/2007 | Cobb | .................. | H04L 41/5083 |
| | | | | | 709/224 |
| 2009/0287744 | A1 * | 11/2009 | Bernardini | .......... | G06F 11/3461 |

(Continued)

OTHER PUBLICATIONS

Borrego-Jaraba, Francisco, Pilar Castro Garrido, Gonzalo Cerruela García, Irene Luque Ruiz, and Miguel Ángel Gómez-Nieto, A Ubiquitous NFC Solution for the Development of Tailored Marketing Strategies Based on Discount Vouchers and Loyalty Cards, Sensors 13, No. 5: pp. 6334-6354 (Year: 2013).*

(Continued)

*Primary Examiner* — Errol Carvalho
(74) *Attorney, Agent, or Firm* — SNELL & WILMER L.L.P.

(57)     ABSTRACT

The system may provide an access function to a customer device. The system may receive, from the customer device, a request for the business function via the access function. The system may provide, to the customer device, the business function. The access function may include at least one of a QR code, a link in an SMS text, a link in an email, an NFC tag or a NFC tap that provides a business function for a business. The business function may include issuing a coupon, validating the coupon, enrolling in a loyalty program, issuing points in the loyalty program, providing a review request, setting a reminder, adding to a promotions list, downloading an app, connecting on social media, sending a payment link, booking an appointment, sending a survey, sending a gift account, enrolling in a birthday club and joining a referral program.

20 Claims, 8 Drawing Sheets

(56)        References Cited

U.S. PATENT DOCUMENTS

| | | | | |
|---|---|---|---|---|
| 2012/0143634 A1* | 6/2012 | Beyda | ................... | G06Q 40/08 |
| | | | | 705/4 |
| 2013/0212610 A1* | 8/2013 | Hussain | ............. | H04N 21/4784 |
| | | | | 725/23 |
| 2014/0095211 A1* | 4/2014 | Gloerstad | ............. | G06Q 40/08 |
| | | | | 705/4 |
| 2017/0171043 A1* | 6/2017 | Gurdasani | ........... | G06F 11/3055 |
| 2017/0228719 A1* | 8/2017 | Jamieson | ........... | G06Q 20/3221 |
| 2019/0014018 A1* | 1/2019 | Ramalingam | ............ | G08B 5/22 |
| 2019/0213626 A1* | 7/2019 | Khoyilar | ............... | G06F 16/144 |
| 2019/0377652 A1* | 12/2019 | Sahoo | ................ | G06F 11/3447 |
| 2019/0378143 A1* | 12/2019 | Volpi | ..................... | G06Q 30/02 |
| 2020/0294095 A1* | 9/2020 | Buerger | ............ | G06Q 30/0269 |
| 2020/0296026 A1* | 9/2020 | Michael | .................. | H04L 45/12 |
| 2020/0387923 A1* | 12/2020 | Mitchell | ............. | G06Q 20/387 |
| 2022/0083983 A1* | 3/2022 | Lee | ................... | G06Q 10/1095 |
| 2022/0262203 A1* | 8/2022 | Yi | ..................... | G06Q 20/0655 |
| 2023/0206271 A1* | 6/2023 | Le | ..................... | G06Q 30/0222 |
| | | | | 705/14.1 |

OTHER PUBLICATIONS

Sanjay Kumar Pal, Khushbu Kumari Jha, Personal Marketing Framework based on QR Code, Scholedge Publishing, vol. 04, Issue 08, pp. 65-87 (Year: 2017).*

* cited by examiner

205

Provide an access function to a customer device

210

Receive, from the customer device, a request for the business function via the access function

215

Provide, to the customer device, the business function

COMPANY
Your Logo Here

Please let us know how we did by providing a review

I am satisfied

You can find us on these sites

Google
★★★★★ facebook
★★★★★ yelp
☐☐☐☐☐ nextdoor
★★★★★

I am not satisfied

Submit feedback to the store manager

REAL-TIME DIGITAL CONNECTION DURING A TRANSACTION

FIELD

The present disclosure generally relates to creating links for a customer to various social media and marketing services from a company, and more particularly, to creating a personalized bar code to access the social media links and marketing services.

BACKGROUND

Current marketing tools may require a business to attempt to acquire customers before a customer purchase or try to retain the customer after a purchase. However, to find potential customers, the business may need to purchase very expensive marketing lists of potential customers. The business may then need to spend a large amount of money on a marketing company and a graphic design company to develop eye-catching and interesting marketing materials to send to the potential customers. Sending the materials in the regular mail is very expensive for the business and customers often discard most mailers. The business trying to obtain a valid email address for the potential customer can also be challenging. Moreover, even if the business is able to obtain some valid email addresses, most customers employ spam filters to remove the marketing email before the marketing email even arrives in the customer inbox. Additionally, even if the marketing email arrives in the customer inbox, a very low percentage of customers may open the email, partly out of concern that the marketing email may be a phishing attempt to surreptitiously obtain personal information about the customer. If the customer opens the email, the customer may not be interested in the contents or the customer may not have the time to review the email, so the email is quickly deleted without the customer purchasing the services.

To retain a customer after a purchase, the business would typically need to obtain personal information about the customer during the purchase, to allow the business to follow-up with additional contacts to the customer. However, customers are very reluctant to provide personal information to a business because the process of providing the information is time-consuming. The customer may also not want their personal information in the business databases because many businesses are subject to hacking. Furthermore, many customers receive way too many notifications, advertisements and emails via various channels (e.g., mail, email, text, calls, etc.), so customers are very reluctant to allow a business to send the customer even more notifications, advertisements and emails.

When a customer is interested in a business, the customer is typically required to search for the proper links to a particular business of interest in order to access information about the business. After hopefully finding a link to the correct business, then the customer must often search through numerous webpages on the business website to find a loyalty program. The customer must also search for the sign-up form for the loyalty program. The loyalty program sign-up form often requests a large amount of data about the customer. Moreover, the loyalty form may require that the customer print the sign-up form, populate the information and scan in the completed form, which is time-consuming, so the customer often abandons the effort.

SUMMARY

In various embodiments, the system, method or article of manufacture may include a process of providing, by a processor, an access function to a customer device. The process may receive, by the processor and from the customer device, a request for the business function via the access function. The process may provide, by the processor and to the customer device, the business function. The access function may include at least one of a QR code, a link in an SMS text, a link in an email, an NFC tag or a NFC tap that provides a business function for a business. The business function may include one or more of issuing a coupon, validating the coupon, enrolling in a loyalty program, issuing points (or stamps) in the loyalty program, providing a review request, setting a reminder, adding to a promotions list, downloading an app, connecting on social media, sending a payment link, booking an appointment, sending a survey, sending a gift account, enrolling in a birthday club and/or joining a referral program.

In various embodiments, the issuing the coupon may include providing, by the processor, at least one of a QR code, SMS text, email, NFC tag or NFC tap for use by the customer device to access the coupon. The validating the coupon may include receiving, by the processor, a validation code from the customer device, wherein the customer device receives the validation code from the coupon; sending, by the processor, the validation code in an API call to a validation platform; receiving, by the processor, a confirmation of the validation code, in response to the validation platform confirming the validation code; and validating, by the processor, the coupon based on the confirmed validation code. The enrolling in the loyalty program may include providing, by the processor, at least one of a QR code, SMS text, email, NFC tag or NFC tap for use by the customer device to access a log-in page for the loyalty program. The issuing points in the loyalty program may be in response to receiving customer information associated with the loyalty program, wherein the customer information includes at least one of customer email, customer phone number, customer account number associated with the loyalty program or QR code associated with the loyalty program.

In various embodiments, the providing the review request may include providing, by the processor, at least one of a QR code, SMS text, email, NFC tag or NFC tap for use by the customer device to access a landing page with links to a profile of the business with the review request. The setting the reminder may include providing, by the processor, at least one of a QR code, SMS text, email, NFC tag or NFC tap for use by the customer device to access at least one of a webpage or an app for at least one of sending the reminder, setting a frequency of the reminder or setting a time frame for the reminder to be sent. The adding to the promotions list may include providing, by the processor, at least one of a QR code, SMS text, email, NFC tag or NFC tap for use by the customer device to access at least one of a webpage or an app for registering for the promotions list.

In various embodiments, the downloading the app may include providing, by the processor, at least one of a QR code, SMS text, email, NFC tag or NFC tap for use by the customer device for the downloading of the app. The connecting on social media may include providing, by the processor, at least one of a QR code, SMS text, email, NFC tag or NFC tap for use by the customer device to access a landing page with links to business profiles on the social media. The sending the payment link may include providing, by the processor, at least one of a QR code, SMS text, email, NFC tag or NFC tap for use by the customer device to access at least one of a webpage or an app for the client device to use for at least one of mobile payments, online ordering, online bookings or online reservations. The booking the appointment may include providing, by the processor, at least one of a QR code, SMS text, email, NFC tag or NFC tap for use by the customer device to access at least one of a webpage or an app for the client device to use for the booking of the appointment. The sending the survey may include providing, by the processor, at least one of a QR code, SMS text, email, NFC tag or NFC tap for use by the customer device to access at least one of a webpage or an app for the client device to access the survey. The sending the gift account may include providing, by the processor, at least one of a QR code, SMS text, email, NFC tag or NFC tap for use by the customer device to access at least one of a webpage or an app for the client device to receive the gift account. The enrolling in the birthday club may include providing, by the processor, at least one of a QR code, SMS text, email, NFC tag or NFC tap for use by the customer device to access at least one of a webpage or an app for the client device to use for the enrolling in the birthday club. The joining the referral program may include providing, by the processor, at least one of a QR code, SMS text, email, NFC tag or NFC tap for use by the customer device to access at least one of a webpage or an app for the client device to use for the joining the referral program.

BRIEF DESCRIPTION OF THE DRAWINGS

Many advantages of the present disclosure will be apparent to those skilled in the art with a reading of this specification in conjunction with the attached drawings, wherein like reference numerals are applied to like elements and wherein.

DETAILED DESCRIPTION

The system enables real-time digital communication between a business and a customer during the purchase process. The system creates a digital connection or digital bridge between the business brand and the customer as a result of the engagement at the point of purchase. The system provides tools for creating digital coupons, loyalty programs, landing pages, marketing automation, reputation management and/or social media management.

Figure 7:
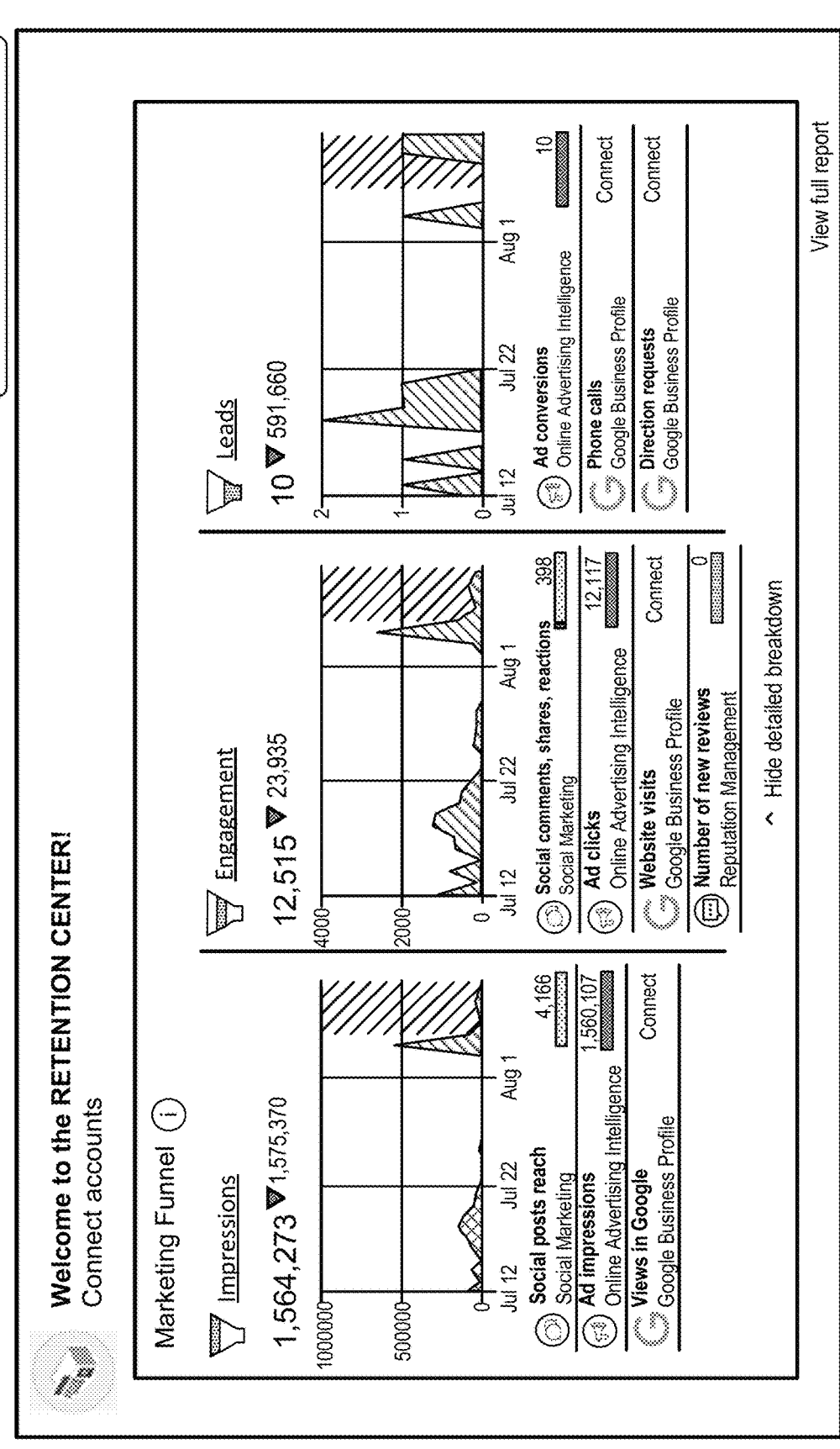
FIG. 7 is an exemplary dashboard, in accordance with various embodiments.

The system may include a unified reporting dashboard that reports on any of such tools. As set forth in FIG. 7, the dashboard may provide graphs, data and links about impressions, engagement and leads. For example, with continued reference to FIG. 7, an exemplary dashboard may provide the number of impressions over time, social posts reach, ad impressions, views in Google, social comments, social shares, social reactions, ad clicks, website visits, number of new reviews, ad conversions, phone calls, direction requests, etc.

In various embodiments, the system may convert a marketing action into a QR code and/or a link to a landing page. The use of the QR codes and links may allow a customer to obtain personalized perks and digital solutions during the check-out experience. The QR code (or a bar code) may include dark and light sections that forms a pattern and represents different portions of information. When scanned by a camera or smart device, the unique patterns on the code translate into data, URL links to websites or apps, contact data, calendar data, email addresses, phone numbers, SMS texts, plain text and/or geolocation data. In various embodiments, the system may include marketing applications with an option of presenting the marketing segment integrated into each application in the form of a customized QR code (e.g., includes branding colors). During the registration, a business may provide a full set of links that access the business' marketing information. The marketing information and/or related links may include, for example, social media channels, websites, profiles on review websites, loyalty programs, appointment booking platforms, referral programs and other similar programs.

In various embodiments, to comply with certain branding or trademark guidelines for the businesses, the system may provide color coordination for any portion of the interface and materials (e.g., QR codes and landing pages). The system may incorporate various brand visuals (e.g., logos, banners, brand images), website links, terms of use links and privacy links. The system may also incorporate links to social media profile pages and online review pages utilized by the businesses. In various embodiments, the system may convert the link into a short URL specific to each registered brand of the business and specific to the active marketing action. The system may then associate a QR code with each short URL. The QR code may be the most convenient form of delivery for marketing information. A business representative may opt for giving a customer certain information in the form of a QR code, email, text message and/or an NFC tap. If the business sends a QR code, the QR code may be displayed within the color pallet provided by a business. The color pallet for the QR code may be set up during a registration process for the business. The short URL and QR code may generated in response to a user request in the specific app, and the system may send a link to the short URL or display the QR code.

In various embodiments, the system may provide an email, wherein the email may include the name of the business, their logo, address, website and the links to the business functions or services. The system may allow the business and/or customer to choose a subset of the business functions to include in the email. The business may provide the contents of the email during a registration process. The system may allow the email to be customized. For example, the email may include customer personalization with the title and the name of the email containing the first and last name of the customer. The business representative may enter the customer information into the system during the transaction process. The system may also allow for personalization of a text message. The system may include in the text message the first and last name of a customer, along with any desired links.

Providing these features during the transaction or check-out experience starts a marketing conversation that may increase customer loyalty and may increase the likelihood that the customer may return to the same business due to the positive and immediate interaction. By providing instant and measurable results, the system removes extra steps, removes time delays and increases efficiency in the loyalty and marketing process. In various embodiments, the system provides a fast and easy way for a customer to interact with a business, for the business to create personalized messages for the customer, for reducing time for enrolling (e.g., sign-up process) to a business loyalty/reward program and/ or for reducing time for registering with a business. In various embodiments, the system provides for real-time collections of reviews and other input (provided by the customer) and allows for real-time reputation management (e.g., the business can quickly react to receiving any negative reviews). The system automates sales, automates marketing, allows for the collection of more reviews of the business and/or incorporates the use of reputation management. In various embodiments, the system may allow a business to issue and validate digital coupons and vouchers. In various embodiments, the system may provide a referral program for existing customers to introduce new customers to the business and allow the existing customers to get rewarded. In various embodiments, the system may allow the business to provide personalized offers at the place of purchase. In various embodiments, the system may further allow for the customer to book, schedule and/or plan for different appointments with the business.

The system may collect, synchronize and/or standardize data (e.g., content, coupons, review requests, etc.) from, for example, cloud data warehouses, points of sale and/or customer relationship management (CRM) applications. The synchronization may occur on any schedule, a periodic schedule, a random schedule, an algorithmic schedule or as set by the business. The system may sync the customer data in real-time. The system may monitor the volume and types of changes to the data. The system may notify the business of the data, the volume, any changes to the data/volume or any other issues. To increase security, in various embodiments, the system may include an architecture that offloads as much synchronization logic as possible to the customer's data warehouse (or Google workspace). The system may include security that permits users to access needed information based on the user role, but the system may restrict the user from accessing information that is not needed for the user role. The system may use technologies to protect the data at rest (e.g., using the Google cloud integrated features) and the system may encrypt the data while in transit. Any of the functions discussed herein may be implemented in real-time, near real-time, after a predetermined delay or periodically.

In various embodiments, for added security, most of the data may be hosted by the system and/or hosted by the other services closely associated with the system. By minimizing third party hosting, the system reduces potential data leakage. The system may allow the export of any business-associated data or customer data from their account on the system if, for example, the business or customer needs to use the data outside of the system. The export of the data may be initiated upon customer and/or business request.

In various embodiments, the system may post any portion or all of the captured data to a business' system. The system may use webhooks and post the data in real-time or as a periodic batch data dump (e.g., once a day or several times a day). The system may convert the non-standard data from the system and the system may convert the non-standard data from the business to a standard format. The system may sync the data from the system with the business' CRM, CMC, SMS or Email platforms, or any other system of choice. As such, because the system provides an ecosystem of products, a business may be able to handle all (or a subset) of its marketing needs by using the system.

In various embodiments, the system may include a web application. In various embodiments, any portion of the system may be a stand-alone system or integrated to any existing marketing ecosystem for data capture, data storage and/or message delivery. In various embodiments, the message delivery may be instant, personalized, pre-set and/or one-on-one. The system may not require the writing of new computer code, creating messages or creating landing pages for each feature. The system may include links that access landing pages within websites or within apps. In various embodiments, the system may integrate with any platform such as, for example, Google, Facebook and Quickbooks.

The system may enable the frontline sales teams to engage with customers during a purchase for one-on-one marketing experience. Because of the real-time interactions, the system provides the business with a chance to engage a customer, while the customer's positive experience is at a higher level. As such, the system allows the business to directly interact with the most motivated customers. The system also provides many opportunities for customization, so a business can enjoy the freedom to select an individual approach to each customer. Certain aspects of the system are implemented while the customer is at the point of purchase, so the system combines the advance digital marketing with the human factor. Because the system provides ads directly to the customer, the system also reduces the need for a business to rely on paid search advertisements (e.g., GoogleAds) for digital marketing and promotion.

To help implement the system, the business may use a smart tablet (e.g., iPad) and the customer may use a smartphone (e.g., iPhone). However, the system includes the business and/or customer using any type of computer hardware and/or software that provides for the selection of links, icons or data; the generation of QR codes; and/or the scanning of a QR code symbol or data. The system may include any internet-connected device. While the system may be disclosed as using a QR code, the system also contemplates the use of any type of barcode, indicator, identifier, code, text, symbol or the like that may convey data or access data. The barcode may include any of the multiple supported barcode formats from the customer's mobile device. The system may include a QR code that provides customers the same access to certain links or data, or a personalized QR code that provides a particular link based on the particular customer and/or the particular business. The customer may be able to display a QR code on the customer iPhone such that the business may scan the customer QR code. The scanning of the customer QR code may result in many different functions. For example, the scanning of the customer QR code may result in the business rewarding the customer loyalty account a certain number of loyalty points from the business. The purchase process may include an in-store purchase at a point-of-sale, an online purchase, a mobile purchase or any other system for conducting a transaction.

Each participant may be equipped with a computing device in order to interact with the system and facilitate online commerce transactions for any items. The customer may use a computing unit in the form of a personal computer, although other types of computing units may be used including laptops, notebooks, hand-held computers, set-top boxes, cellular telephones, touch-tone telephones, and the like. The business may use a computing unit implemented in the form of a computer-server, although other implementations are contemplated by the system such as a mini-computer, a PC server, a network of computers located in the same of different geographic locations, or the like. Moreover, the system contemplates the use, sale or distribution of any goods, services, or information over any network having similar functionality described herein.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Figure 1:
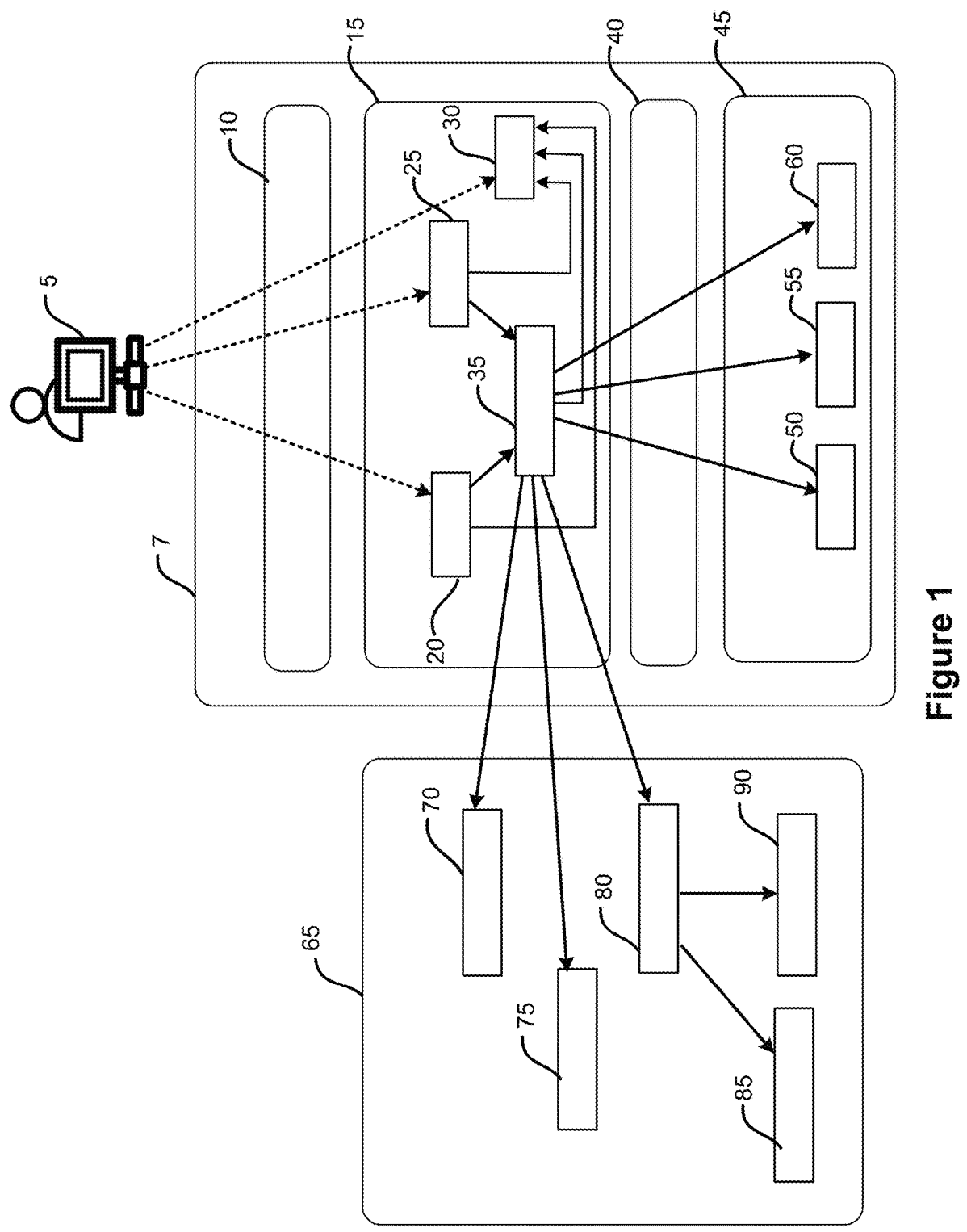
FIG. 1 is an exemplary architecture diagram of the major components of the system, in accordance with various embodiments.

In various embodiments, and as set forth in FIG. 1, the system may include a customer device 5 that may access a cloud platform 7 through a cloud firewall 10. In various embodiments, the system may include a bitbucket (e.g., Atlassian). The bitbucket may be a CI/CD system to produce containers from source code and build packs. The bitbucket may perform unit tests and integration tests on built containers and/or deploy containers to staging environments and production environments. In various embodiments, the customer device 5 may access a container orchestration system 15 (e.g., Google cloud kubernets services maintained by the Cloud Native Computing Foundation). The container orchestration system 15 may be configured for automating software deployment, scaling and/or management. The container orchestration system 15 may include a container runtime for web services, APIs, workers and/or schedulers. The container orchestration system 15 may include right-scaling and/or self-healing to replace failed containers. In various embodiments, the container orchestration system 15 may include a business website server 20, an administrative website server 25, an identity server 30 and a RESTful (REST) API 35. The customer device 5 may access, through the firewall 10, the identity server 30 to authenticate the customer device 5. The customer device 5 may access, through the firewall 10, the business website 20 and the administrative website 25. Each of the business website 20, the administrative website 25 and the REST API 35 may interface with the identity server 30 for authentication. Each of the business website 20 and the administrative website 25 may interface with the REST API 35.

With continued reference to FIG. 1, in various embodiments, the REST API 35 is an application programming interface (API or web API) that conforms to the constraints of the REST architectural style and allows for interaction with RESTful web services. The REST API 35 may interface with and send data for storage in, through a cloud VPN 40 (e.g., internal Google cloud VPN), the cloud databases 45. In various embodiments, the cloud databases 45 may include, for example, an activity logs database 50 (e.g., Mongo database) for customer data and/or transactions, a configuration database 55 (e.g., My SQL database) for the configuration data (e.g., business data and/or system settings) and a files/images database 60 (e.g., Google cloud storage bucket). The REST API 35 may also interface with third party services 65. In various embodiments, the third-party services 65 may include, for example, a marketing management service 70, a loyalty programs service 75 and a notifications service 80. In various embodiments, the notifications service 80 may send notifications to an SMS sender service 85 and/or an email sender service 90, In various embodiments, the system may include software as the development tool (e.g., Linux operating system with .NET Core SDK 3.1).

The system may include different types of data. The data may be encrypted when in transit, at rest, in databases and in cloud storage. In various embodiments, the system may include configuration data, customer data and log data. The configuration data may include data used to configure the user (e.g., customer and business) accounts. In particular, the configuration data may include email addresses, names, company names, credentials (e.g., for accessing data warehouses), SaaS applications, source code repositories (e.g., usernames, passwords, OAuth tokens and certificates), names of databases, names of schemata, names of tables, names of columns, names of custom objects, names of custom fields and audit logs (e.g., covering changes to one or more of the above items).

The customer data may include data provided by a customer to the system. The customer data may be manually input by the customer and/or received via the point-of-sale system. The customer data may include location data, payment methods, identifiers and/or personal documents. The customer data may be synched to and from third party platforms (e.g., without requiring manual import of customer data).

The log data may include logs, traces and samples produced by the system. The system may produce log data while performing customer-initiated marketing actions. The log data allows the system to monitor the health of the system and track down any issues. The log data may include a trace of the actions performed by the system (e.g., during data entry, message delivery or any other customer action). The log data may include snapshots of configuration data at the time the action was performed. The log data may include stack traces and samples of running code. The log data may include customer data. The log data may be stored for indexing, monitoring and trending. The log data may be part of the elastic search. The elastic search may include a search engine based on the Lucene library. The elastic search may provide a distributed, multitenant-capable I-text search engine with an HTTP web interface and schema-free JSON documents.

In various embodiments, the system may allow users to access data (e.g., configuration data, customer data, log data, business data, purchase data, loyalty data, marketing data, etc.), and receive updated data in real time from other users. In various embodiments, the system may store the data (e.g., in a standardized format) in a plurality of storage devices, provide remote access over a network so that users may update the data in a non-standardized format (e.g., dependent on the hardware and software platform used by the user) in real time through a GUI, convert the updated data that was input (e.g., by a user) in a non-standardized form to the standardized format, automatically generate a message (e.g., containing the updated data) whenever the updated data is stored and transmit the message to the users over a computer network in real time, so that the user has immediate access to the up-to-date data. In various embodiments, the system allows remote users to share data in real time in a standardized format, regardless of the format (e.g. non-standardized) that the information was input by the user. The system may compile all (or any subset of) data related to the business functions (e.g., images, logos, links, location details and variable fields) into one or more message templates, or into one or more landing page connected to one or more URL (e.g., a custom branded short URL). The data may be in different non-standard formats, so the system converts the data into a standardized format for the message templates or landing pages. The system may also include a filtering tool that is remote from the end user and provides customizable filtering features to each end user. The filtering tool may provide customizable filtering by filtering access to the data. The filtering tool may identify data or accounts that communicate with the server and may associate a request for content with the individual account. In various embodiments, the system may include a filter on a local computer and a filter on a server. The system may also store elements from different websites in a database, then when a user accesses the database, the system may provide a hybrid webpage that merges content from the different websites. In response to a customer request to access data, the system may merge customer data, business data, purchase data, loyalty data, marketing data, etc. and provide a link to the customer to access the merged data.

Figure 2:
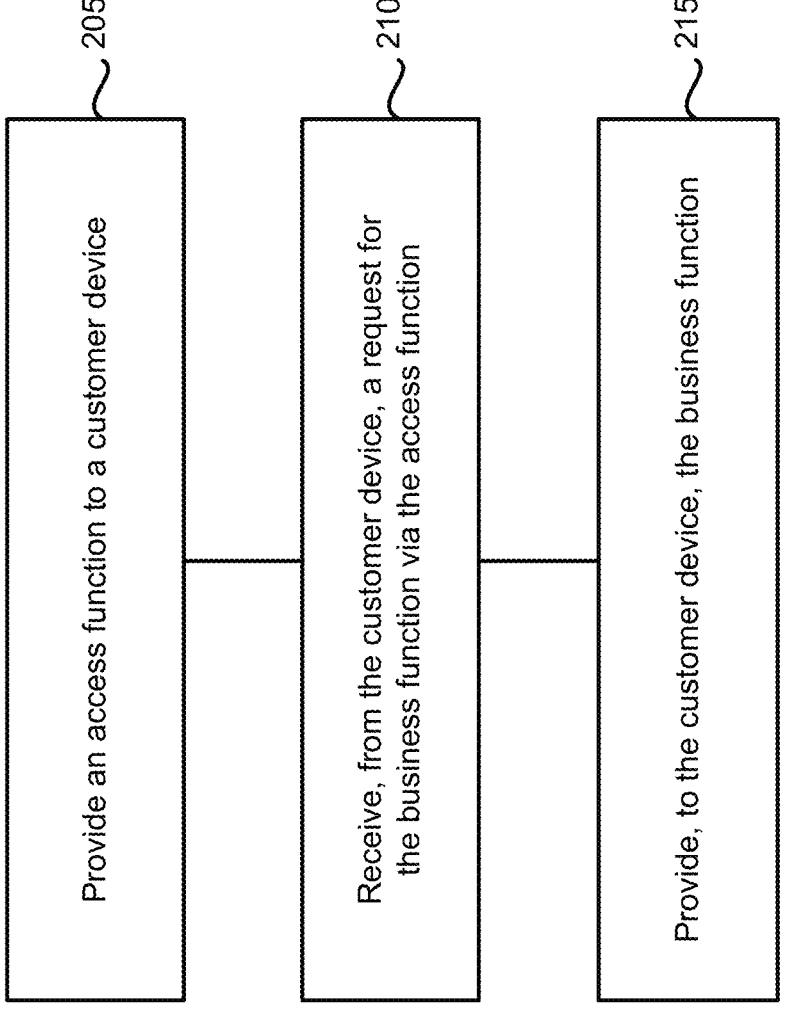
FIG. 2 is an exemplary flow chart of the major steps of the method, in accordance with various embodiments.
Figure 3:
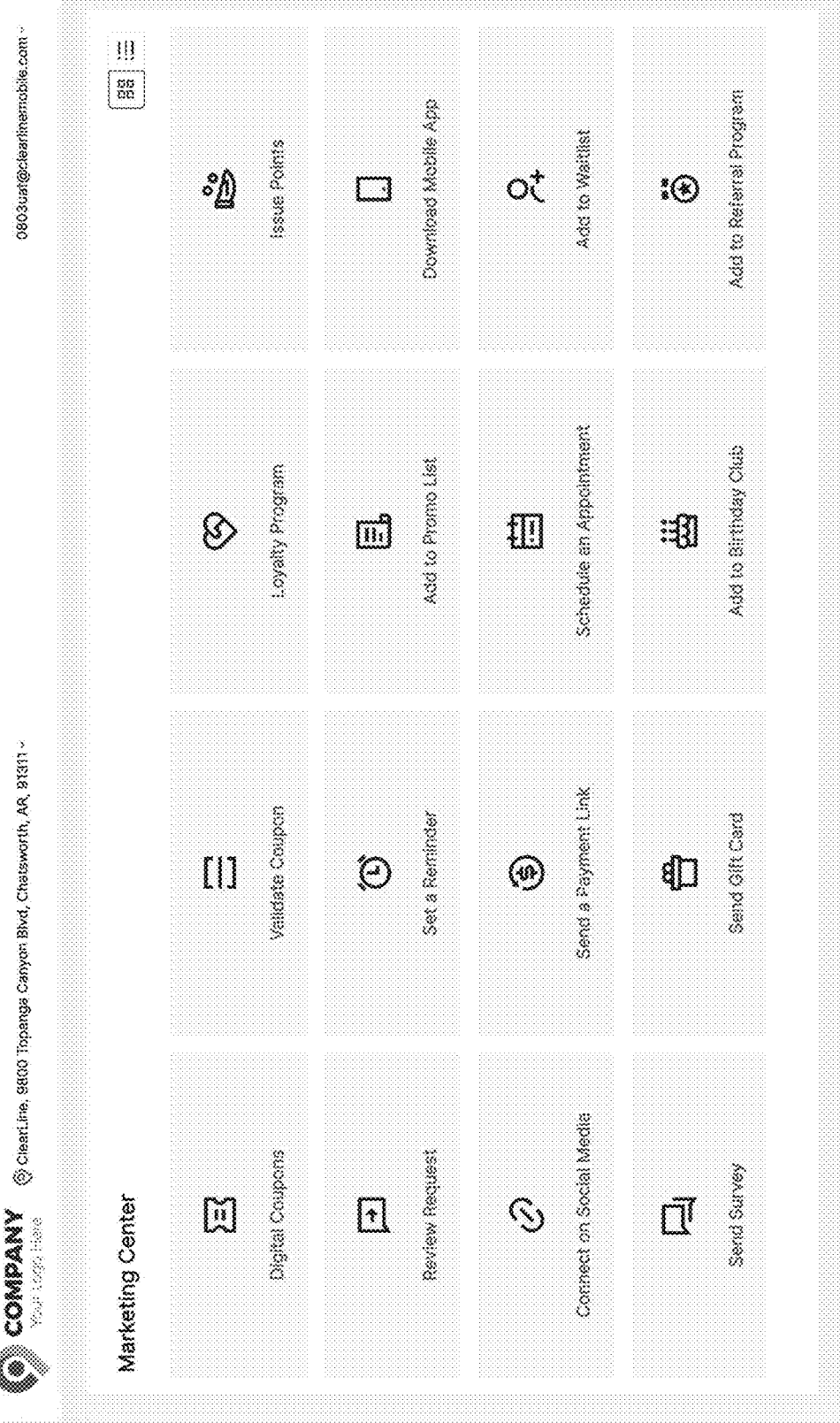
FIG. 3 is an exemplary screenshot of certain business functions, in accordance with various embodiments.

The system may enable various features and business functions. In various embodiments, and with respect to FIG. 2, the system may provide an access function to a customer device (step 205). The system may receive, from the customer device, a request for the business function via the access function (step 210). The system may provide, to the customer device, the business function (step 215). The access function may include at least one of a QR code, a link in an SMS text, a link in an email, an NFC tag or a NFC tap that provides a business function for a business. As set forth in FIG. 3, in various embodiments, the business function may include one or more of issuing a coupon, validating the coupon, enrolling in a loyalty program, issuing points (or stamps) in the loyalty program, providing a review request, setting a reminder, adding to a promotions list, downloading an app, connecting on social media, sending a payment link, booking an appointment, sending a survey, sending a gift account, enrolling in a birthday club and/or joining a referral program. Any portion of the business functions may be provided by the system or the system may interface with (or re-direct the customer to) an external source, app or system that may provide any portion of the business function. Any of the business functions may be activated or inactivated in a marketing apps settings screen.

Figure 4:
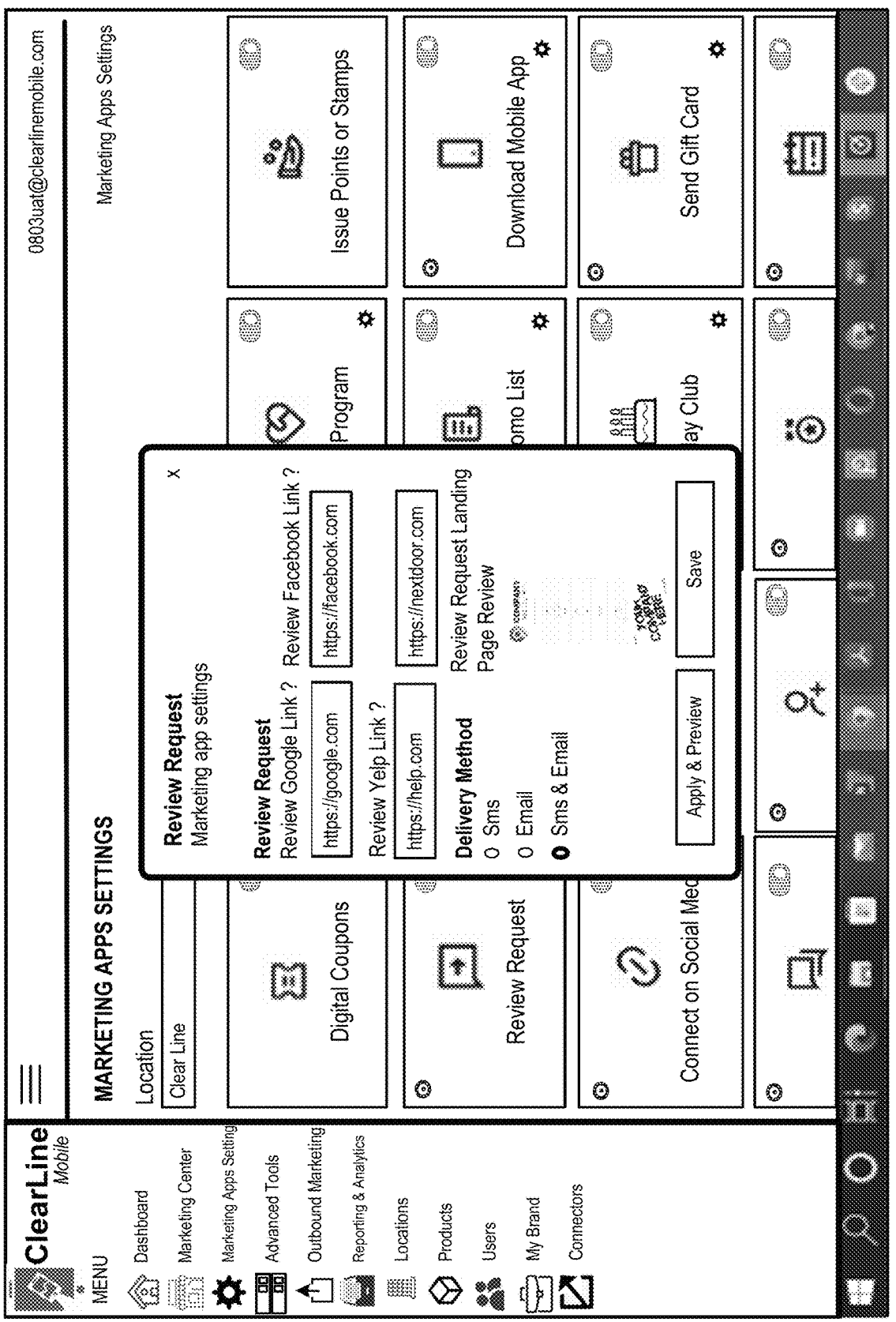
FIG. 4 is an exemplary screenshot of the user interface for a business to set up the review requests, in accordance with various embodiments.
Figure 5:
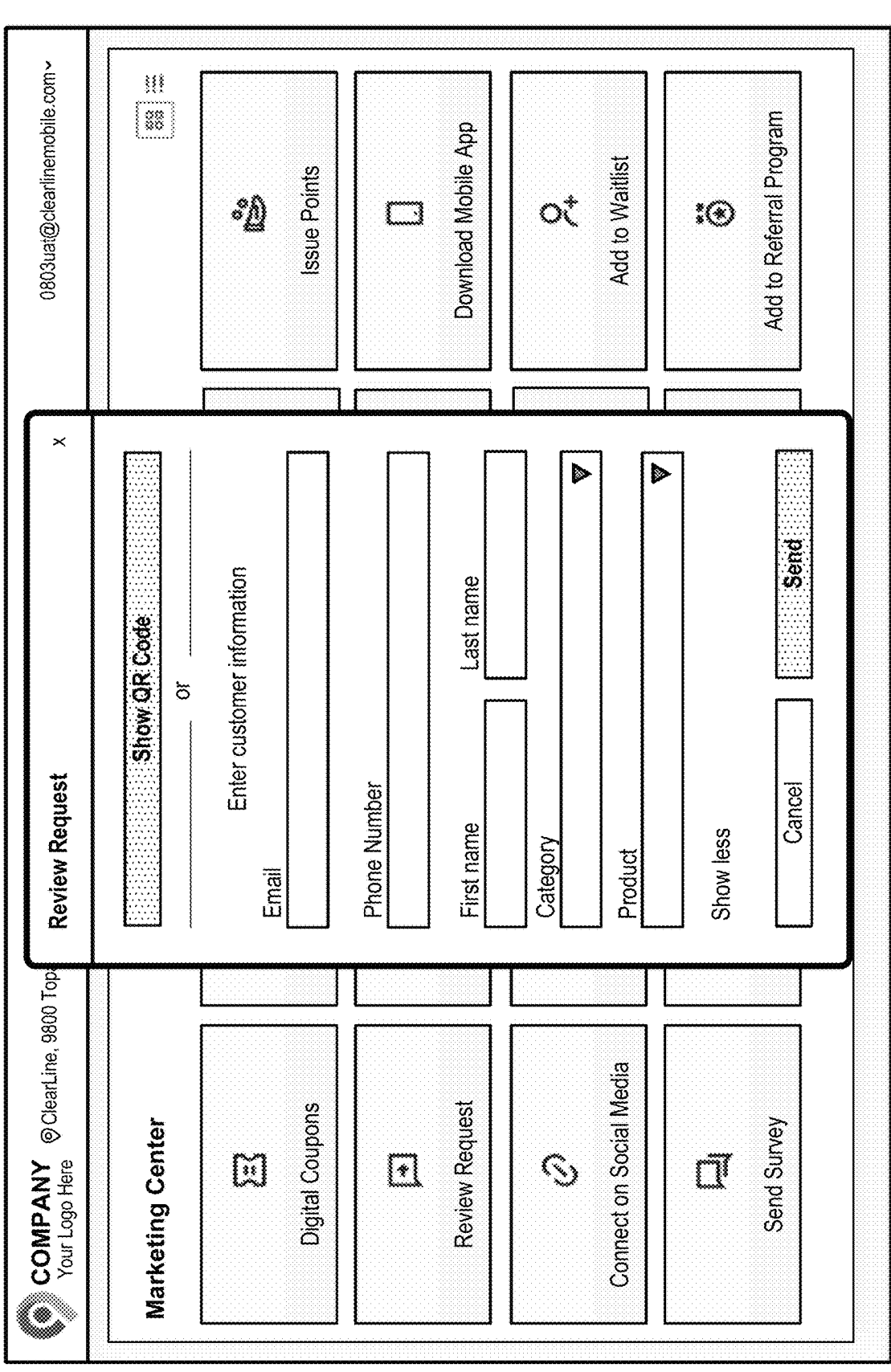
FIG. 5 is an exemplary screenshot for a consumer to obtain a QR code to obtain webpages for submitting a review, in accordance with various embodiments.
Figure 6:
FIG. 6 is an exemplary screenshot of certain third-party review webpages, in accordance with various embodiments.
Figure 6:
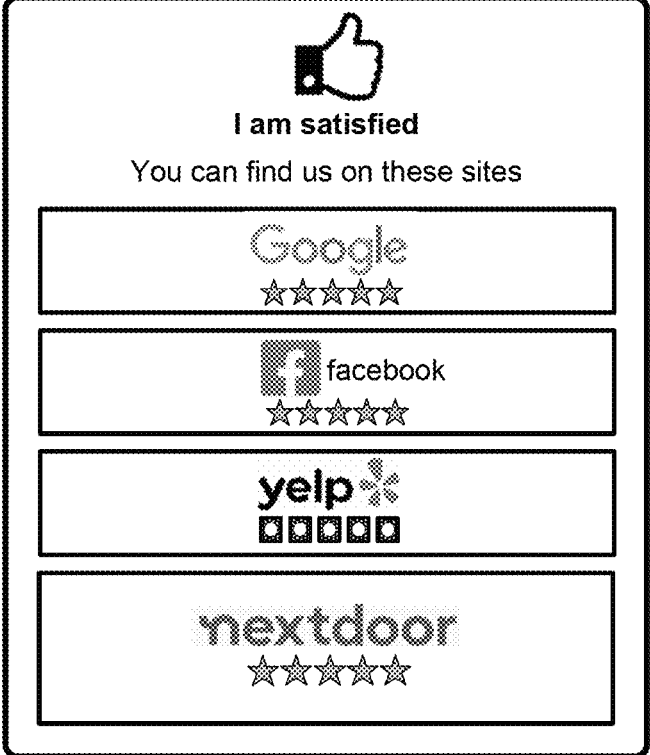
Figure 6:
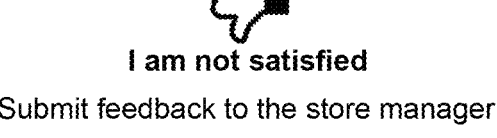
Figure 6:
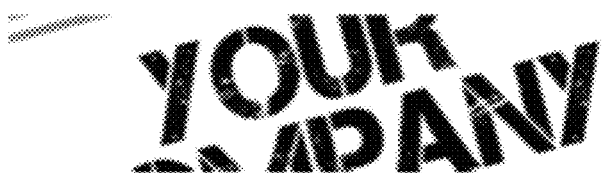

In various embodiments, as set forth in FIGS. 4-6, the system may provide the functionality for providing a review request and collecting the review input. As set forth in FIG. 4, the system may allow a business to set up a review request. For the example, the system may request that the business provide links to the review webpages (e.g., from Google, Facebook, Yelp, Next Door, etc.) and the delivery method (e.g., SMS, email, SMS and email), then the system may generate a sample preview of the review webpage for approval by the business. The business employee may ask the customer to provide feedback and leave a review. As set forth in FIG. 5, the customer can request a QR code from the business and scan the QR code from the business tablet. The system may also request that the customer provide information such as, for example, email, phone number, category and product. The business QR code may instruct the customer device to browse to a landing page. The customer may also agree to receive an SMS or email message (e.g., one-time message) with a link to the landing pages (e.g., customized and branded) with links and logos to multiple review pages that are associated with the business. The email may contain a collection of direct links to a business' profiles on one or more review websites. The landing pages may contain review links that may be hosted within the system or within a third-party system. The system may also provide an NFC tag or a payment terminal supporting NFC tap connectivity that sends customers directly to a landing page with links to a business' profiles on external review services, such as Yelp, Google and Facebook reviews. As set forth in FIG. 6, the landing page may include links to the business' profiles on external review services. The customer may select any of the logos of the review networks (e.g., Google, Yelp, Facebook, Nextdoor, etc.) or any of the more than 50 available review sites. After a customer has left the review for the business, the system may send an email to the registered email to inform the business about the newly collected review.

The business may select the review details in the email to be redirected to the reputation management dashboard. The reviews section of the dashboard (as set forth in FIG. 7) may display all (or any subset of) reviews received by the business from multiple review sites. The dashboard may include an option to respond to the reviews with one of the preset options or enter a custom response to the review. The system may publish a business review response to the online review platform (Google) or redirect users to the Yelp page to enter such a response.

In various embodiments, the system may provide a customer engagement workflow. The customer engagement workflow may be described with respect to the review requests, but a similar customer engagement workflow may apply to different business functions. The system interface may include a web SaaS, a tablet, a mobile app and/or barcode scanner. The system backend may include, for example, one or more app servers, database servers, API gateway and/or MDM (mobile device management). The system may compile a marketing data packet for the customer. The marketing data packet may include, for example, content, logo, banner, location, phone, email, social links and/or a marketing action (e.g., business function). The business function may be preset and may be created in the form of a kit (e.g., preset marketing actions kit). The system may compile the marketing data packet with one or more business functions into a compiled packet. The system may create an access function. The action function may be customized. The action function may include a URL, QR code or landing page that uses the data from the compiled packet. The action function may be sent to the customer device. The action function may be customized landing pages with embedded links to the business review profiles on multiple review sites.

The business system may include, for example, one or more payment terminal, POS system, ad display smart television, kiosk, tablet, cashier system, back office systems and/or API integration automated flow. The cashier may initiate engagement with the customer by using one of the business system devices. The cashier and/or the system may cause a QR code to display on the screen along with one or more of the business functions. The system may provide content and data to the business system. The business system may use a geolocation system to track a customer being near the business. The business system may use a geo-notification push to the customer mobile device. The geo-notification push may be in response to a mobile device app being installed and/or loyalty award, points or coupon being saved in the Apple mobile wallet or Google passes.

The customer interface devices may include a smartphone, QR code, SMS text, email, NFC and/or landing page. With respect to the inbound real-time marketing, in response to the customer being near a business location, the system may provide a geo-notification push to the mobile device of the customer. The system may provide the business device (customer facing screen) with business function options for display on the business device. The business device may provide a QR code for the customer to scan and/or the system may send a text message to the customer. With respect to the outbound real-time marketing, the cashier, the business system or the system may cause the business device (customer facing screen) to include a QR code for scanning by the customer device and/or an NFC tag for the customer to tap. The customer device may display a customized landing page with embedded links to the business review profiles on multiple review sites.

In various embodiments, the system may be used for the business function of issuing and/or acquiring a coupon. The customer may use a smartphone to scan a QR code on the business tablet. In response to the customer smartphone scanning the business QR code, the customer smartphone may access a coupon. The system may also send an SMS text containing a link to the coupon. Depending on the account settings, the system may further send an email that contains a link to the coupon and/or the email may include a layout of the coupon. The system may include an NFC tag or a payment terminal supporting NFC tap connectivity that may direct the customer smartphone directly to the coupon. The customer engagement flow may be similar to the review request customer engagement flow above. The preset marketing actions kit may include business functions of issuing loyalty points/stamp, issuing rewards/prize, validating serial coupon and/or confirming referral code/status. In response to the customer being near the business, the customer loyalty check-in may include the business device (customer facing screen) may request that the customer scan a QR code, check-in with the mobile device phone number and/or tap an NFC tag. The business loyalty check-in may include the cashier, business system or the system causing the business device to request that the customer scan a QR code, tap an NFC tag, check-in via a mobile phone number or email and/or enter an account number. The system may update the customer's loyalty points or stamps balance and send the new loyalty amount to the customer device for display on the customer loyalty device.

The system may allow a business to offer digital coupons for their customers by creating the coupons, adding the location details and displaying the coupons in the Issue a Coupon App. To issue a digital coupon to the customer, the system may select the coupon and utilize one of the delivery methods available. The customer may open a coupon page on a mobile device, computer, or tablet. The customer may select a banner, link in an email or link in an SMS text. The customer may scan a QR Code, tap an NFC tag or enabled device, or make a selection on the customer-facing screen (e.g., tablet, kiosk, etc.). The customer may have multiple options to save the coupon for later use such as, for example, save to email, SMS, print, add to a mobile wallet or use now. The coupon may be configured as a one-time use, a serialized coupon, or capture customers' data and collect opt-in for future marketing.

In various embodiments, the coupons may be hosted and created on a third-party platform (e.g., 2RewardMe platform). The links may lead to the coupons on the third-party platform. The coupon may be in any form or format. For example, the coupon may be an image or PDF of the coupon that can be provided to a business. In various embodiments, the coupon may include its own QR code, an alphanumeric code or other identifier that the business can scan or enter to apply a discount to a transaction for a customer. The customer may also upload the coupon or coupon value to another system (e.g., add the coupon value as additional credit in an online account) or transfer the coupon to others, if desired.

In various embodiments, the use of the coupon may also include a validation process. The customer may obtain a code from the coupon or the customer may scan a QR code on the coupon. To validate the coupon, customers can use a tablet, any internet connected smartphone with a camera, a dedicated barcode scanner, or their existing POS barcode scanner. Depending on the type of account setup, the system may perform the validation (e.g., within a Marketing Center platform) such that the customer does not need to transmit any data outside the platform. The system may send an API call to a reward platform (e.g., the 2RewardMe platform) to check if the coupon is valid, the coupon has not been used and/or the coupon is not expired. In response to successful validation of the coupon, the system may digitally mark or associate a validation tag with the coupon. The validated coupon may be used on both the customer mobile device and in the reward account of the platform or the account of the business or location.

In various embodiments, the system may provide the functionality to enroll in any type of program (e.g., loyalty program). In various embodiments, the customer may scan a QR code from the business tablet and the QR code may provide instructions for the customer device to browse to a landing page containing a login and signup form for the loyalty program. The system may also send to the customer an SMS text that contains a link to the loyalty program landing page. The system may also send to the customer an email that contains a link to the loyalty program landing page. The system may also provide an NFC tag or a payment terminal supporting NFC tap connectivity that sends a customer directly to the signup form for the loyalty program. The loyalty program landing pages and/or the loyalty programs may be hosted on a third-party platform. To register, customers can select to proceed with a Google or Facebook profile. The customer may enter personal information and email, then create a password. In response to registration, the customer may be re-directed to the loyalty program page. The loyalty program page may be business-branded. The customer may save the loyalty program page to bookmarks, add to the home screen, or save to Apple Wallet or Google Passes on the smartphone.

In various embodiments, the system may also provide the functionality for issuing points. The system may acquire or access some of a customer's information associated with their loyalty account such as, for example, email, phone number, account number or an account QR Code. In various embodiments, the system may use the Marketing Center platform to issue the points, so the system does not need to access other platforms. The system may issue the points remotely via API or manually, depending on the specific use case.

In various embodiments, the system may also provide the functionality for setting a reminder. The system may provide a QR code that leads to a page or an app that a business may use for reminders. The system may also send an SMS text to the customer that contains a link to a page or an app that a business may use for reminders. The system may also send to the customer an email that contains a link to a page or an app that a business may use for reminders. The pages and apps used to set reminders may be associated with system, hosted on system or located outside of the system. The system may include an NFC tag or a payment terminal supporting NFC tap connectivity that sends customers directly to a page or an app that business may use for reminders. The system may provide an internal reminder service via SMS text and/or email where the customers may select reminder frequency and the total time frame for the reminders to be sent to the customers.

In various embodiments, the system may also provide the functionality for adding a customer to a promotions list. The customer device may scan a QR code that leads to a page or an app that a business may use for a promotion list opt-in page. Customers may register on the opt-in page to receive promotional offers from the business via SMS, email, telephone calls, push notifications and/or direct mail. The system may send an SMS text that contains a link to a page or an app that a business may use for a promotion list opt-in page. The system may send an email that contains a link to a page or an app that a business may use for a promo list opt-in page. The landing pages and opt-in forms used for a promotions list can be associated with the system and thus hosted on one of the system hosting sites, or the landing pages and opt-in forms can be located outside of the system. The system may include an NFC tag or a payment terminal supporting NFC tap connectivity that sends customers a page or app that a business may use for a promotions list opt-in page.

In various embodiments, the system may also provide the functionality for downloading an app (e.g., a loyalty app, a business app, etc.). The system may provide a QR code that provides instructions to the customer device to download a page from which an app can be downloaded. The system may send to a customer device an SMS text that contains a link to a page from which an app can be downloaded. The system may send to a customer device an email that contains a link to a page from which an app can be downloaded. The system may include an NFC tag or a payment terminal supporting NFC tap connectivity that sends customers to a page from which an app can be downloaded. The app may be associated with the system and thus hosted on the system, or the app may be located and hosted outside of the system. For example, if the app is hosted on the Apple Store and Google Play, the system may provide links to download the apps directly from such marketplaces.

In various embodiments, the system may also provide the functionality for the customer to connect with the business on social media. The system may provide a QR code that provides the customer device with instructions to download a landing page with links to a business' profiles on popular social media, such as Facebook, Instagram and Twitter. The system may send an SMS text that contains a link to such landing pages with social links. The system may send an email that contains a collection of links to a business' profiles on social media. The system may provide an NFC tag or a payment terminal supporting NFC tap connectivity that sends customers to a page with social links. The landing pages containing social media links may be hosted within the system platform and its products.

In various embodiments, the system may also provide the functionality for the business to send a payment link to the customer. The system may provide a QR code that provides instructions to the customer device to download a page or an app that a customer may use for mobile payment to a business. The customer may also use the app for online ordering from the business or booking a reservation with the business. The system may send an SMS text to the customer that contains a link to a page or an app that a customer may use for mobile payment to a business, online ordering from the business or booking a reservation with the business. The system may send to the customer an email that contains a link to a page or an app that a customer may use for mobile payment to a business, online ordering from the business or booking a reservation with the business. The system may include an NFC tag or a payment terminal supporting NFC tap connectivity that sends customers to a page. The pages and apps used for payment can be associated with the system and thus hosted on the system or located outside of the system.

In various embodiments, the system may also provide the functionality for a customer to book an appointment. The system may provide a QR code that provides instructions for the customer device to download a page or an app that a customer may use for appointment booking with the business. The system may send an SMS text to the customer that contains a link to a page or an app that a customer and/or business may use for appointment booking. The system may send to the customer an email that contains a link to a page or an app that a customer and/or business may use for appointment booking. The system may include an NFC tag or a payment terminal supporting NFC tap connectivity that sends customers to a page or app that a customer and/business may use for appointment booking. The pages and apps used for appointment booking can be associated with the system and hosted on the system or located outside of the system. In various embodiments, the appointment booking may be performed via a product provided by the system retention center and hosted on one of the platforms associated with the system, due to the fact that the system may offer the appointment booking app as part of a bundle with other services.

In various embodiments, the system may also provide the functionality for the business to send a survey link to the customer. The system may send to the customer device a QR code that provides instructions to download a page or an app that a customer and/or business may use for surveys. The system may send to the customer an SMS text that contains a link to a page or an app that a customer and/or business may use for surveys. The system may send to the customer an email that contains a link to a page or an app that a customer and/or business may use for surveys. The system may include an NFC tag or a payment terminal supporting NFC tap connectivity that sends customers to a page or an app that a customer and/or business may use for surveys. The pages and apps used for surveys can be associated with the system and hosted on the system or located outside of the system. In various embodiments, the surveys may be created and hosted on a third-party platform.

In various embodiments, the system may also provide the functionality for the customer and/or business to send a gift card, send a gift account, renew a gift account, re-load a gift account or any other gift account function. The system may provide to the customer a QR code that leads to a page or an app that a business may use for storing and/or issuing gift accounts. Any of the gift accounts may be associated with the business, a national brand or other entities. The system may send to the customer an SMS text that contains a link to a page or an app that a business may use for storing and/or issuing the gift accounts. The system may send to the customer an email that contains a link to a page or an app that a business may use for storing and/or issuing the gift accounts. The system may provide an NFC tag or a payment terminal supporting NFC tap connectivity that sends customers to a page or an app that a business may use for storing and issuing gift accounts. The pages and apps used for storing and/or sharing gift accounts can be associated with the system and hosted on the system or located outside of the system. In various embodiments, the system may include closed loop gift accounts that may be used within the system and may be created and/or hosted on a third-party platform. In various embodiments, the closed loop gift accounts may only be used by the customer at the business locations.

In various embodiments, the system may also provide the functionality for the business to acquire birthday data and establish the customer in a birthday club for the business. The system may provide to the customer device a QR code that provides instructions to the customer device to download a page or an app that a business may use for its birthday club and enroll its customers via a web form or any other data capture method. The system may send to the customer an SMS text that contains a link to a page or an app that a business may use for its birthday club and enroll its customers via a web form or any other data capture method. The system may send an email to the customer that contains a link to a page or an app that a business may use for its birthday club and enroll its customers via a web form or any other data capture method. The system may include an NFC tag or a payment terminal supporting NFC tap connectivity that sends customers to a page or an app that a business may use for its birthday club and enroll its customers via a web form or any other data capture method. The pages and apps used for the business' birthday club can be associated with the system and hosted on the system or can be located outside of the system. In various embodiments, the birthday club used within the system may be organized via a product provided by the system Retention Center and hosted on one of the platforms associated with the system (e.g., the SMS gateway platform).

In various embodiments, the system may also provide the functionality for the business to sign-up the customer in a referral program and/or reward the customer for participating in a referral program associated with the business. The system may provide to the customer device a QR code that provides instructions to the customer device to download a page or an app that a business may use for its referral program, allow customers to join the program and/or allow customers to refer their friends and family to the business. The system may send an SMS text to the customer device that contains a link to a page or an app that a business may use for its referral program, allow customers to join the program and/or allow customers to refer their friends and family to the business. The system may send an email to a customer device that contains a link to a page or an app that a business may use for its referral program, allow customers to join the program and/or allow customers to refer their friends and family to the business. The system may include an NFC tag or a payment terminal supporting NFC tap connectivity that sends customers to a page or an app that a business may use for its referral program, allow customers to join the program and/or allow customers to refer their friends and family to the business. The pages and apps used for a referral program can be associated with the system and hosted on the system or located outside of the system. In various embodiments, the system may provide third-party referral program solutions (e.g., Referral Hero).

Figure 8:
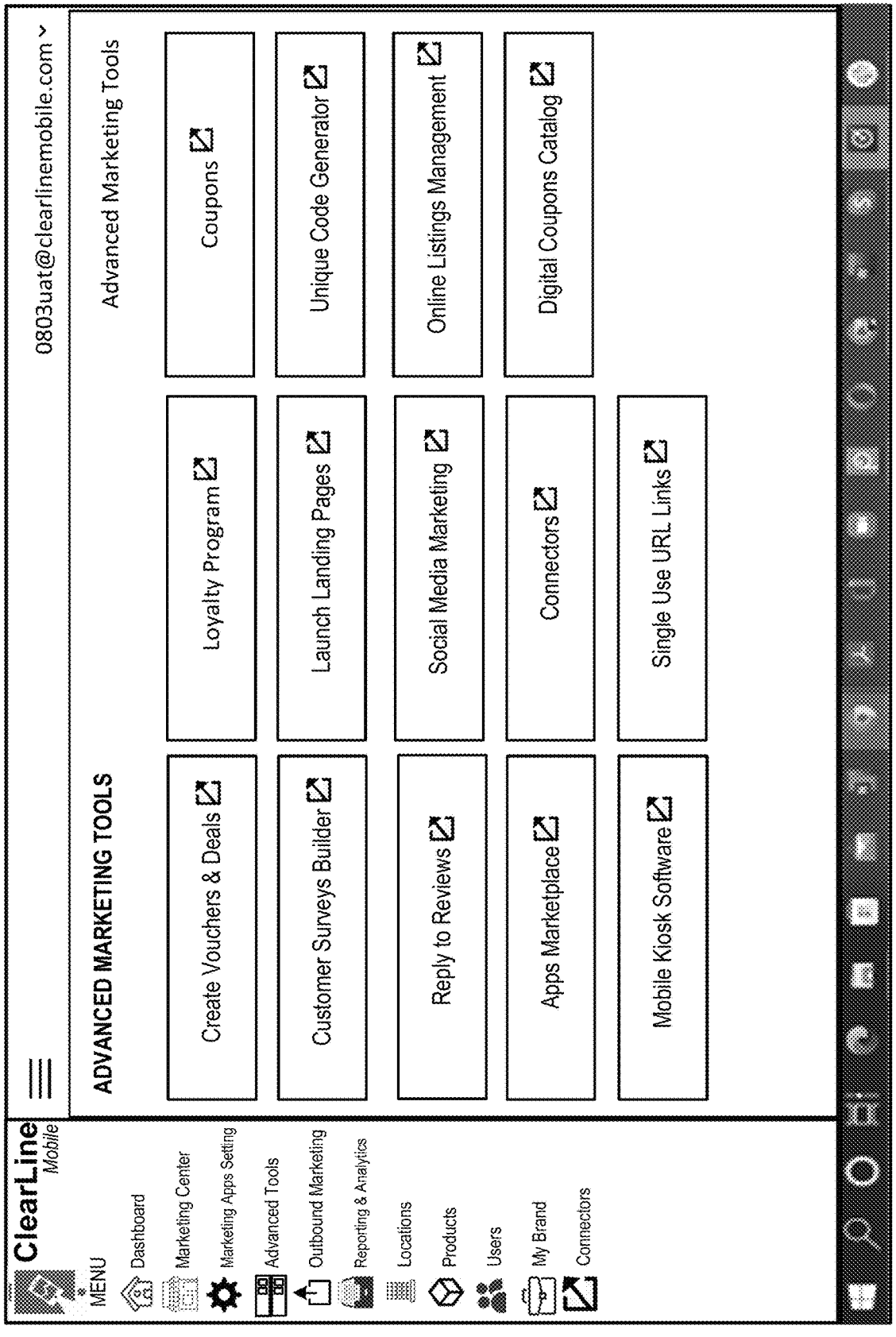
FIG. 8 is an exemplary user interface for selecting advanced marketing tools and/or functionality, in accordance with various embodiments.

As set forth in FIG. 8, the system may also provide advanced marketing tools and related functionality. The advanced marketing tools and/or functionality may include, for example, creating vouchers, creating deals, loyalty programs, coupons (e.g., digital coupons), customer surveys builder, launch landing pages, unique code generator, reply to reviews, social media marketing, online listings management, apps marketplace, connectors, digital coupon catalog, mobile kiosk software, single use URL links, etc.

The system may create gamified coupons, digital coupons, gift cards and/or vouchers. Mobile coupons may be in the form of a unique code in an SMS message or a unique link to a digital coupon. The system may include templates that can be used or customized.

Digital loyalty cards include collecting customer contact information, notifying customers of updates on deals, providing points for purchases and creating a community of people loyal to the business brand. The system may include a loyalty card builder to create mobile loyalty cards and combine loyalty rewards with digital coupons. The system may include an all-digital program without the requirement to download an app. The system may interface with any smartphone, integrate with any mobile wallet and interface with any point-of-sale system. The loyalty accounts may be associated with a stamp card, a point card and/or a reward card. With respect to a stamp card, after a customer has received a certain number of stamps, the customer may receive a reward. The rewards may be set up by the business owner. With respect to a point card, the customer may receive points. The number and rules for rewarding points may be set up by the business owner. With respect to a reward card, the customer may collect and save points to be used for available rewards. The customer may select when and which reward the customer receives, pending availability of the reward.

The system may include any type of text-type functionality or messaging. The system may include sending or receiving SMS or MMS messages. The system may use shortcode, toll-free, local number, alphanumeric sender ID or a business landline. The system may provide a customer with a certain number of credits for SMS or MMS messaging.

The system may include online appointment booking that allows customers to book appointments online with real-time time slots displayed, availabilities and automated reminders. The system may increase a business' bookings by 40%, while reducing no-show rates by up to 80% and saving hours per week. The appointments may be stored in the customer's profile. The system enables the business to set the duration for each service separately. The system may integrate with the business calendar and/or customer calendar. The system may also integrate with Gmail and Hotmail. The system allows the inclusion of extra questions that a business may want its customers to answer prior to the appointment. The system allows the business to include the questions during the setting up of the appointment booking.

The system may include a digital waitlist that minimizes or eliminates the need for customers to wait in line. The business may add a QR code to a website, emails, tablet, a flyer or a sign posted near the front door with some simple instructions for the customers to join the waitlist. The customer may also join the waitlist by texting the business. The system provides an option to eliminate a physical line and simply tell each customer when the customer should arrive. The feature may work with any mobile phone. The system may notify the business when someone joins or leaves the waitlist. The system may send a text to the customer confirming their place in line. The system allows the business and/or customer to view the status on the waitlist. The system allows the customer to track the line on the website or via text messages.

The system may include management and hosting of a business' website. The system may interface with Google Cloud Platform with WordPress. The system may include one-click ecommerce, hosting, robust cms, website design, ssl certificate, daily backups and engaging reporting. The system may also provide hosting, SSL certificates, *.websitepro.hosting domain, unlimited storage, migration plugin, unlimited backups, unlimited traffic, domain setup, custom templates and/or support.

The system may include reputation management. The reputation management may provide monitoring what people are saying about the business online by compiling reviews from different review websites. The system may also improve a business' visibility in a search. For example, the system may improve a search rank by identifying online business listings that are inaccurate or missing. The system may provide data on how a business may compare against the competition, provide automated alerts when a business is mentioned online and provide progress reports to see how the business reputation has improved. The system may manage reviews, respond to reviews in-line, review a display widget, provide sentiment analysis, review statistics, monitor listings, monitor mentions, monitor citations, provide listings statistics, provide listing statistics of competitors, provide social monitoring, provide digest emails and/or provide executive reports. The system may create, test and modify customer questionnaires in real-time. The customer surveys may be fully compatible with WordPress and most CMS systems.

The system provides functionality to store offers directly in a customer's phone. The system does not require the use of apps, installs or verifications. The system allows the business to send the customers notifications or implement the business' loyalty program scheme. The offers may include the implementation of a stamp card or punch card. The system may include multi-level offers. The system may provide customer referral rewards. The system may also provide geofencing marketing. The loyalty program may be adapted for single or multiple locations. The loyalty program may involve functionality for spending based rewards, targeted offers, targeted deals, push notifications and iBeacon.

The system provides functionality for social marketing. The system provides functionality for generating leads, scheduling ready-to-publish content, communicating with followers all from one place, tagging in posts, tracking links, social audience analytics, post-performance analytics, social profiles, scheduled posts, calendar view and drafted posts. The system supports social media including Facebook, Instagram, Twitter, LinkedIn and Google My Business. The business may post everywhere from one place, engage followers, generate social leads, get notifications when the business gets replies or new leads and provide comprehensible analytics on how each network is faring.

The system may create random codes and links for promotional and marketing needs. The system may allow the business to choose the code length, numeric or alphanumeric, and starting number. As such, the system minimizes or eliminates the use of third parties like Bitly or Cuttly. The system may create voucher codes and digital gift cards for distribution, for the business to give away for free or sell to a customer with integrated PayPal. The system provides functionality to track redemptions and the flexibility to change the voucher or gift card settings at any time.

The system may provide the functionality for a tablet kiosk app. The system may create and launch a tablet kiosk for data capture, coupon issuing, waitlist, check-in for a loyalty program, and more.

The system may provide the functionality for landing pages and smart forms. The system may create mobile-friendly landing pages (without coding), add images, add links, add social media links, and provide forms to edit customer information.

The system may provide the functionality for email marketing. The system may create email campaigns, custom templates or use preset emails. The system may provide the functionality for sending emails with special offers, newsletters and coupon codes. The system allows a business to work on templates and increase CTR.

The system may provide the functionality for content performance analytics and distribution. The system may help identify which content, pages and/or products are generating the most shares and which social media networks to invest in to increase ROI. The system may track both public and private/dark social shares like WhatsApp, Facebook Messenger, email, and Slack to give a business the full visibility into where and how people are sharing content. Dark Social Shares can represent up to 98% of all shares, depending on content type. The system may also provide the number of referrals those shares generated, allowing for better attribution and decision making. The system may provide functionality for social widgets, identifying real virality, automating content distribution and knowing channels. The system provides access to tools made specifically for mobile devices like the mobile share bar and the mobile follow bar. The pop-ups and welcome/subscriber bars are responsive and may adapt themselves to different screen sizes. The system may also consolidate reports from different social media sites. The system may provide functionality for requesting reviews on the medium that works best for the customers—either text message or email. The system may provide methods such as, for example, email, SMS, review generation widget, email signature widget and mobile kiosk. The system may provide functionality for reporting on all the major social media channels and for exporting reports to CSV, PDF, PowerPoint and Google Slides. The system may provide functionality for connecting pages and profiles and reporting on full-funnel performance including Impressions, Video Views, Engagement, Growth, and Clicks. The system allows businesses to determine the kind of content that works best, track the performance of content pillars/themes and view audience insights. The system may connect ad accounts and see in-depth performance stats for all ad campaigns.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for purposes of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements.

Further, it should be noted that the system may employ any number of techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components may be contemplated. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices. The AI or ML may store data in a decision tree in a novel way.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, HS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SF TP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any communication, transmission, and/or channel discussed herein may include any system or method for delivering content (e.g., data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant web site, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUIMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through various data association techniques. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet may be contemplated.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

The invention claimed is:

1. A method comprising:

providing, by one or more processors, a geo notification push to a remote customer device, in response to at least one of an app being installed on the remote customer device or a loyalty award, loyalty points or loyalty coupon being saved in a digital wallet of the remote customer device;

receiving, by the one or more processors, updates to transaction data in a first non-standardized format and updates to customer data in a second non-standardized format from the remote customer device of a customer, and based on a hardware and software platform of the remote customer device;

wherein the first non-standardized format of the updated transaction data is compatible with a remote point of sale device that conducts a remote transaction with the transaction data, but is not compatible with the remote customer device, and wherein the second non-standardized format from the remote customer device is compatible with the remote customer device that provides the updated customer data, but is not compatible with the remote point of sale device;

standardizing, by the one or more processors, the updated transaction data in the first non-standardized format, the updated customer data in the second non-standardized format and updated data about a personalized business function in a third non-standardized format from the disparate systems to a standard format to allow real-time access by the remote customer device to the standard format of the updated transaction data, the updated customer data and the updated data about the personalized business function;

providing, by the one or more processors, to the customer device a QR code that at least one of enables the customer to access to at least one of a link or data, or is a personalized QR code that provides a particular link based on at least one of a particular customer or particular business, in response to receiving the transaction data and the customer data from the customer device, wherein the at least one of the link or the data accesses the personalized access function that provides customized access by the customer device to a personalized business function of the business, wherein the customized access is customized based on the business, a business function of the business, the transaction data and the customer data;

storing, by the one or more processors, the personalized access function and the personalized business function in indexes as log data, wherein the log data includes, a trace of actions performed by the one or more processors, snapshots of configuration data at the time the personalized access function and the personalized business function were performed, customer data, stack traces and samples of running code, wherein the configuration data includes email addresses, names, company names, credentials, SaaS applications, source code repositories, usernames, passwords, OAuth tokens, certificates, names of databases, names of schemata, names of tables, names of columns, names of custom objects, names of custom fields and audit logs, wherein the personalized access function includes at least one of another QR code, a link in an SMS text, a link in an email, an NFC tag or a NFC tap, and wherein the personalized business function includes issuing a coupon, validating the coupon, enrolling in a loyalty program, issuing points in the loyalty program, providing a review request, setting a reminder, adding to a promotions list, downloading an app, connecting on social media, sending a payment link, booking an appointment, sending a survey, sending a gift account, enrolling in a birthday club and joining a referral program;

receiving, by the one or more processors and from the remote customer device, a request for the personalized business function via the personalized access function;

filtering, by the one or more processors using a filtering tool remote from the remote customer device, access to the personalized business function based on the configuration data by associating request for the personalized business function with an account of the personalized access function;

providing, by the one or more processors and to the customer device, the personalized business function; and rewarding, by the one or more processors, loyalty points from the business to a loyalty point account of the customer, in response to a scanning of the QR code on the customer device.

2. The method of claim 1, wherein the issuing the coupon includes providing, by the one or more processors, at least one of a QR code, SMS text, email, NFC tag or NFC tap for use by the customer device to access the coupon.

3. The method of claim 1, wherein the validating the coupon includes:

receiving, by the one or more processors, a validation code from the customer device, wherein the customer device receives the validation code from the coupon;

sending, by the one or more processors, the validation code in an API call to a validation platform;

receiving, by the one or more processors, a confirmation of the validation code, in response to the validation platform confirming the validation code; and validating, by the one or more processors, the coupon based on the confirmed validation code.

4. The method of claim 1, wherein the enrolling in the loyalty program includes providing, by the processor, at least one of a QR code, SMS text, email, NFC tag or NFC tap for use by the customer device to access a log-in page for the loyalty program.

5. The method of claim 1, further comprising conducting, by the one or more processors, an elastic search using a search engine based on the Lucene library, wherein the elastic search utilizes a distributed, multitenant-capable full-text search engine with an HTTP web interface and schema-free JSON documents.

6. The method of claim 1, wherein the issuing points in the loyalty program is in response to receiving customer information associated with the loyalty program, wherein the customer information includes at least one of customer email, customer phone number, customer account number associated with the loyalty program or QR code associated with the loyalty program.

7. The method of claim 1, wherein the providing the review request includes providing, by the processor, at least one of a QR code, SMS text, email, NFC tag or NFC tap for use by the customer device to access a landing page with links to a profile of the business with the review request.

8. The method of claim 1, wherein the setting the reminder includes providing, by the processor, at least one of a QR code, SMS text, email, NFC tag or NFC tap for use by the customer device to access at least one of a webpage or an app to use for reminders.

9. The method of claim 1, wherein the setting the reminder includes providing, by the processor, at least one of a QR code, SMS text, email, NFC tag or NFC tap for use by the customer device to access at least one of a webpage or an app for at least one of sending the reminder, setting a frequency of the reminder or setting a time frame for the reminder to be sent.

10. The method of claim 1, wherein the adding to the promotions list includes providing, by the processor, at least one of a QR code, SMS text, email, NFC tag or NFC tap for use by the customer device to access at least one of a webpage or an app for registering for the promotions list.

11. The method of claim 1, wherein the downloading the app includes providing, by the processor, at least one of a QR code, SMS text, email, NFC tag or NFC tap for use by the customer device for the downloading of the app.

12. The method of claim 1, wherein the connecting on social media includes providing, by the processor, at least one of a QR code, SMS text, email, NFC tag or NFC tap for use by the customer device to access a landing page with links to business profiles on the social media.

13. The method of claim 1, wherein the sending the payment link includes providing, by the processor, at least one of a QR code, SMS text, email, NFC tag or NFC tap for use by the customer device to access at least one of a webpage or an app for the client device to use for at least one of mobile payments, online ordering, online bookings or online reservations.

14. The method of claim 1, wherein the booking the appointment includes providing, by the processor, at least one of a QR code, SMS text, email, NFC tag or NFC tap for use by the customer device to access at least one of a webpage or an app for the client device to use for the booking of the appointment.

15. The method of claim 1, wherein the sending the survey includes providing, by the processor, at least one of a QR code, SMS text, email, NFC tag or NFC tap for use by the customer device to access at least one of a webpage or an app for the client device to access the survey.

16. The method of claim 1, wherein the sending the gift account includes providing, by the processor, at least one of a QR code, SMS text, email, NFC tag or NFC tap for use by the customer device to access at least one of a webpage or an app for the client device to receive the gift account.

17. The method of claim 1, wherein the enrolling in the birthday club includes providing, by the processor, at least one of a QR code, SMS text, email, NFC tag or NFC tap for use by the customer device to access at least one of a webpage or an app for the client device to use for the enrolling in the birthday club.

18. The method of claim 1, wherein the joining the referral program includes providing, by the processor, at least one of a QR code, SMS text, email, NFC tag or NFC tap for use by the customer device to access at least one of a webpage or an app for the client device to use for the joining the referral program.

19. A system comprising:

one or more processors; and one or more tangible, non-transitory memories configured to communicate with the one or more processors, the one or more tangible, non-transitory memories having instructions stored thereon that, in response to execution by the one or more processors, cause the one or more processors to perform operations comprising:

providing, by the one or more processors, a geo notification push to a remote customer device, in response to at least one of an app being installed on the remote customer device or a loyalty award, loyalty points or loyalty coupon being saved in a digital wallet of the remote customer device;

receiving, by the one or more processors, updates to transaction data in a first non-standardized format and updates to customer data in a second non-standardized format from the remote customer device of a customer, and based on a hardware and software platform of the remote customer device;

wherein the first non-standardized format of the updated transaction data is compatible with a remote point of sale device that conducts a remote transaction with the transaction data, but is not compatible with the remote customer device, and wherein the second non-standardized format from the remote customer device is compatible with the remote customer device that provides the updated customer data, but is not compatible with the remote point of sale device;

standardizing, by the one or more processors, the updated transaction data in the first non-standardized format, the updated customer data in the second non-standardized format and updated data about a personalized business function in a third non-standardized format from the disparate systems to a standard format to allow real-time access by the remote customer device to the standard format of the updated transaction data, the updated customer data and the updated data about the personalized business function;

providing, by the one or more processors, to the customer device a QR code that at least one of enables the customer to access to at least one of a link or data, or is a personalized QR code that provides a particular link based on at least one of a particular customer or particular business, in response to receiving the transaction data and the customer data from the customer device, wherein the at least one of the link or the data accesses the personalized access function that provides customized access by the customer device to a personalized business function of the business, wherein the customized access is customized based on the business, a business function of the business, the transaction data and the customer data;

storing, by the one or more processors, the personalized access function and the personalized business function in indexes as log data, wherein the log data includes, a trace of actions performed by the one or more processors, snapshots of configuration data at the time the personalized access function and the personalized business function were performed, customer data, stack traces and samples of running code, wherein the configuration data includes email addresses, names, company names, credentials, SaaS applications, source code repositories, usernames, passwords, OAuth tokens, certificates, names of databases, names of schemata, names of tables, names of columns, names of custom objects, names of custom fields and audit logs, wherein the personalized access function includes at least one of another QR code, a link in an SMS text, a link in an email, an NFC tag or a NFC tap, and wherein the personalized business function includes issuing a coupon, validating the coupon, enrolling in a loyalty program, issuing points in the loyalty program, providing a review request, setting a reminder, adding to a promotions list, downloading an app, connecting on social media, sending a payment link, booking an appointment, sending a survey, sending a gift account, enrolling in a birthday club and joining a referral program;

receiving, by the one or more processors and from the remote customer device, a request for the personalized business function via the personalized access function;

filtering, by the one or more processors using a filtering tool remote from the remote customer device, access to the personalized business function based on the configuration data by associating request for the personalized business function with an account of the personalized access function;

providing, by the one or more processors and to the customer device, the personalized business function; and rewarding, by the one or more processors, loyalty points from the business to a loyalty point account of the customer, in response to a scanning of the QR code on the customer device.

20. An article of manufacture including one or more non-transitory, tangible computer readable storage mediums having instructions stored thereon that, in response to execution by one or more processors, cause the one or more processors to perform operations comprising:

providing, by the one or more processors, a geo notification push to a remote customer device, in response to at least one of an app being installed on the remote customer device or a loyalty award, loyalty points or loyalty coupon being saved in a digital wallet of the remote customer device;

receiving, by the one or more processors, updates to transaction data in a first non-standardized format and updates to customer data in a second non-standardized format from the remote customer device of a customer, and based on a hardware and software platform of the remote customer device;

wherein the first non-standardized format of the updated transaction data is compatible with a remote point of sale device that conducts a remote transaction with the transaction data, but is not compatible with the remote customer device, and wherein the second non-standardized format from the remote customer device is compatible with the remote customer device that provides the updated customer data, but is not compatible with the remote point of sale device;

standardizing, by the one or more processors, the updated transaction data in the first non-standardized format, the updated customer data in the second non-standardized format and updated data about a personalized business function in a third non-standardized format from the disparate systems to a standard format to allow real-time access by the remote customer device to the standard format of the updated transaction data, the updated customer data and the updated data about the personalized business function;

providing, by the one or more processors, to the customer device a QR code that at least one of enables the customer to access to at least one of a link or data, or is a personalized QR code that provides a particular link based on at least one of a particular customer or particular business, in response to receiving the transaction data and the customer data from the customer device, wherein the at least one of the link or the data accesses the personalized access function that provides customized access by the customer device to a personalized business function of the business, wherein the customized access is customized based on the business, a business function of the business, the transaction data and the customer data;

storing, by the one or more processors, the personalized access function and the personalized business function in indexes as log data, wherein the log data includes, a trace of actions performed by the one or more processors, snapshots of configuration data at the time the personalized access function and the personalized business function were performed, customer data, stack traces and samples of running code, wherein the configuration data includes email addresses, names, company names, credentials, SaaS applications, source code repositories, usernames, passwords, OAuth tokens, certificates, names of databases, names of schemata, names of tables, names of columns, names of custom objects, names of custom fields and audit logs, wherein the personalized access function includes at least one of another QR code, a link in an SMS text, a link in an email, an NFC tag or a NFC tap, and wherein the personalized business function includes issuing a coupon, validating the coupon, enrolling in a loyalty program, issuing points in the loyalty program, providing a review request, setting a reminder, adding to a promotions list, downloading an app, connecting on social media, sending a payment link, booking an appointment, sending a survey, sending a gift account, enrolling in a birthday club and joining a referral program;

receiving, by the one or more processors and from the remote customer device, a request for the personalized business function via the personalized access function;

filtering, by the one or more processors using a filtering tool remote from the remote customer device, access to the personalized business function based on the configuration data by associating request for the personalized business function with an account of the personalized access function;

providing, by the one or more processors and to the customer device, the personalized business function; and rewarding, by the one or more processors, loyalty points from the business to a loyalty point account of the customer, in response to a scanning of the QR code on the customer device.

* * * * *